United States Patent [19]

Estrada et al.

[11] Patent Number: 5,611,022
[45] Date of Patent: Mar. 11, 1997

[54] COLOR IMAGING

[75] Inventors: James Estrada, Pasadena; Said Zandian, Agoura, both of Calif.

[73] Assignee: Dataproducts Corporation, Simi Valley, Calif.

[21] Appl. No.: 88,463

[22] Filed: Jul. 7, 1993

[51] Int. Cl.$^6$ .................................................. G06K 15/00
[52] U.S. Cl. ........................ 395/109; 358/465; 358/466
[58] Field of Search .................................... 395/109, 104, 395/101; 358/465, 466, 455, 456, 457, 534, 535, 447, 445, 443, 448, 458, 459, 298, 536; 382/252

[56] References Cited

U.S. PATENT DOCUMENTS

| | | | |
|---|---|---|---|
| 5,051,841 | 9/1991 | Bowers et al. | 358/447 |
| 5,051,844 | 9/1991 | Sullivan | 358/456 |
| 5,060,284 | 10/1991 | Klees | 358/465 |
| 5,070,413 | 12/1991 | Sullivan et al. | 358/456 |
| 5,243,443 | 9/1993 | Eschbach | 358/455 |
| 5,243,445 | 9/1993 | Koike | 358/466 |
| 5,245,678 | 9/1993 | Eschbach et al. | 358/466 |
| 5,254,982 | 10/1993 | Feigenblatt et al. | 345/148 |
| 5,268,774 | 12/1993 | Eschbach | 358/466 |
| 5,317,653 | 5/1994 | Eschbach et al. | 358/456 |
| 5,374,997 | 12/1994 | Eschbach | 358/466 |

OTHER PUBLICATIONS

Robert Floyd and Louis Steinberg, "An Adaptive Algorithm for Spatial Grey Scale", Stanford University, p. 36, SID 75 Digest (1975).

*Primary Examiner*—Edward L. Coles, Sr.
*Assistant Examiner*—Dov Popovici
*Attorney, Agent, or Firm*—Loeb & Loeb LLP

[57] ABSTRACT

A bi-level printer is controlled to selectively enhance each pel, based on an error diffusion process. However, each channel (e.g., RGB red, green and blue color channels; Lab luminance, red direction and blue direction channels; or other suitable channel division) is processed individually according to a suitable kernel to provide a multi-color image. In addition, an individual "threshold" level (by which the "actual" state of enhancement of a pel is determined) is calculated for each color channel, based on the minimum and maximum enhanced levels of all of the pels in the "desired" image. Also, the order of processing individual pels and the error diffusion matrix are both reversed for each subsequent line of pels. It has been found that each one and various combinations of these features significantly improves image clarity, sharpness and tone continuity.

13 Claims, 1 Drawing Sheet

COLOR IMAGING

BACKGROUND OF THE INVENTION

1. Field of the Invention

The present invention relates to improved color imaging systems and methods of making and using the same and, in particular embodiments, to such systems and methods for improved color image printing wherein the status of a picture element is determined based, in part, on error factors which are dependent on the status of neighboring picture elements.

2. Description of Related Art

One well known process of forming an image (such as a graphic design, alphanumeric character, or other indicia formed by a printer, cathode ray tube, LED or other electronic display device) is to divide the area in which the image is to be formed into a plurality of discrete picture elements ("pels"). Each pel is then selectively enhanced, such that the combined plurality of pels forms the desired image.

In many printing environments, the printing system's ability to "selectively enhance" a picture element is "bi-level", in that it is limited to either forming a dot (a black, bright or color spot) or not forming a dot at the picture element location. In such hi-level systems, selected areas (composed of multiple pels) of the image may be made to appear in various shades (e.g., shades of grey, bright or color) by enhancing various numbers of interspaced pels located within the area.

Spacial grey scale techniques for controlling a printer or other imaging apparatus have been used in such bi-level systems to improve the visual appearance of the shaded areas of the printed image. One example of such spacial grey scale techniques is described in the article titled "An Adaptive Algorithm for Spatial Grey Scale" by Robert Floyd and Louis Steinberg, published in SID Digest ("Floyd et al").

Floyd et al. describe an error diffusion system, wherein the processing of one pel in an image is dependent upon the processing of other pels in the image, to provide a more continuous tone image with a bi-level device. An algorithm is used to determine the manner in which the error (the difference between the desired level of darkness and the actual state of the picture element) is diffused among neighboring pels.

According to Floyd et al.'s system, the "actual" enhancement or brightness of a pel is either 0 (dark) or 1 (bright). However, the "desired" brightness at that pel's location in the picture may be anywhere between or including 0 and 1. Accordingly, each pel introduces an error (the difference between the "actual" state of the pel and the "desired" brightness level of the pel) into the picture. For example, if the "desired" brightness level for a pel is ¼, but the pel's "actual" state is dark (0), an error of −¼ is introduced into the picture. On the other hand, if the "desired" brightness for the pel is ¼ and the "actual" state of the pel is bright (1), an error of +¾ is introduced into the picture. Floyd et al. employ the matrix or "kernel" below to determine the distribution of (diffuse) the error introduced by each pel.

```
      * 7
    3 5 1
```

The "*" represents the pel being processed and the numbers "7", "3", "5" and "1" represent weighting factors and locations for neighboring pels that have not yet been processed. The error introduced by the "*" pel is distributed as $7/16$th's, $3/16$th's, $5/16$th's and $1/16$th's to pels 7, 3, 5 and 1, respectively. The "Jarvis kernel," described by Jarvis, et al. shown below is an enhancement of the Floyd et al. "kernel."

```
        * 7 5
    3 5 7 5 3
    1 3 5 3 1
```

However, such matrix systems previously tended to generate defects near the peripheral edges of the image. Moreover, the image quality and continuity of tone in the image were often not as optimal as desired. As a result, the images formed by such systems tended to be blurry and lacking in detail.

Another technique for "grey scaling" is referred to as "screening," wherein the level of enhancement (darkness, brightness or color) of a pel is determined by the number of adjacently disposed small dots which are formed at the pel location. Thus, a lightly enhanced pel may be formed of one or two adjacently disposed small dots, while a highly enhanced pel may be formed of, for example, nine adjacently disposed small dots. According to further grey scaling techniques, the level of enhancement of a pel is controlled by adjusting the size of the dot formed at the pel location. However, these processes require a printing system which is capable of forming a selectable and variable number of adjacently disposed small dots or a selectable and variable size dot for each pel location (i.e., the printing system must be other than a bi-level system).

SUMMARY OF THE DISCLOSURE

Accordingly, it is an object of the present invention to provide an improved color image printing system and method for printing images with improved continuity, sharpness, detail and general image quality in a bi-level printing system.

According to a preferred embodiment of the present invention, a bi-level printer is controlled to selectively enhance each pel, based on an error diffusion process of the type as discussed above with respect to the Floyd, et al. kernel or the Jarvis kernel (or based on other suitable kernels). However, unlike the processes described by Floyd et al. and Jarvis et al., in preferred embodiments, each channel (e.g., RGB red, green and blue color channels; Lab luminance, red direction and blue direction channels; or other suitable channel division) is processed individually according to a suitable kernel to provide a multi-color image.

In addition, an individual "threshold" level (by which the "actual" state of enhancement of a pel is determined) is calculated for each color channel, based on the minimum and maximum enhanced levels of all of the pels in the "desired" image. Also, the order of processing individual pels and the error diffusion matrix are both reversed for each subsequent line of pels. It has been found that each one and various combinations of these features significantly improves image clarity, sharpness and tone continuity.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

Embodiments of the present invention are directed to apparatus and processes for printing (or displaying in other forms) color images with improved continuity in tones, clarity and general image quality, in a hi-level printing system. As described in more detail below, according to a preferred embodiment of the present invention, a hi-level printer is controlled to selectively enhance each pel, based on an error diffusion process of the type as discussed above with respect to the Floyd, et al. kernel or the Jarvis kernel (or based on other suitable kernels).

However, unlike the processes described by Floyd et al. and Jarvis et al., in preferred embodiments, each color channel (e.g., red, green, blue) is processed individually according to a suitable kernel to provide a multi-color image. In addition, an individual "threshold" level (by which the "actual" state of enhancement of a pel is determined) is calculated for each color channel, based on the minimum and maximum enhanced levels of all of the pels in the "desired" image. Also, the order of processing individual pels and the error diffusion matrix are both reversed for each subsequent line of pels. It has been found that each one and various combinations of these features significantly improves image clarity, sharpness and tone continuity.

Figure 1:
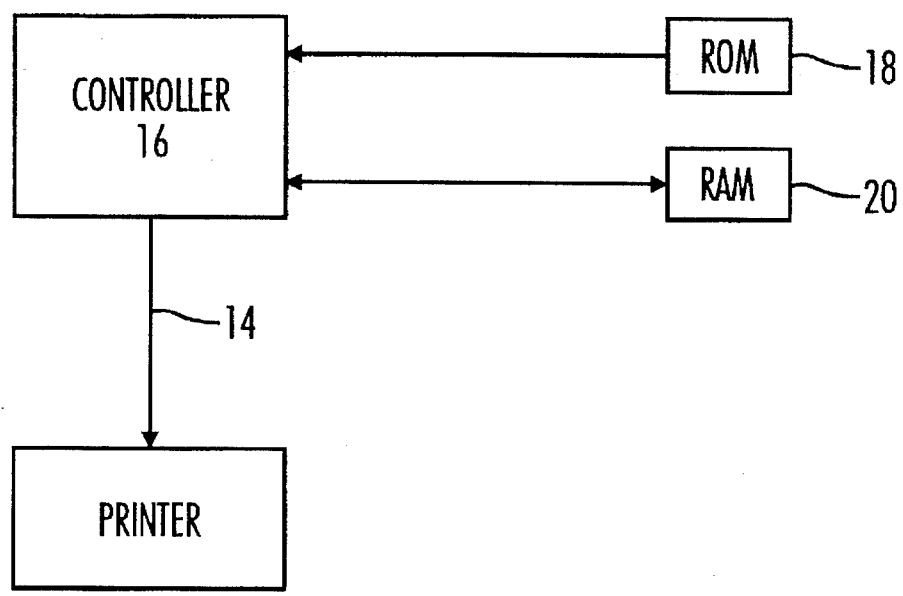
FIG. 1 is a block diagram of apparatus for printing color images according to an embodiment of the invention.

A color imaging system 10 according to an embodiment of the present invention is shown in FIG. 1, wherein a printer 12 is coupled by print data line 14 to a controller 16. The controller 16 is coupled to (or includes as an integral part thereof) a read-only-memory ROM 18 and a random-access-memory RAM 20. The controller has an input port or ports 22 for receiving various input data described below.

In general, the controller responds to image data received at the input 22 (or stored in RAM 20) and, with reference to a suitable kernel and a threshold value (e.g., stored in RAM 20), provides print data on line 14 to the printer 12. In this regard, the controller may include, for example, a processor (such as a suitable microprocessor, processing circuitry, logic circuitry, or the like), read and write circuitry for communicating with RAM 20 and ROM 18 and suitable input and output circuitry to communicate print data to the printer 12 and to receive various input data.

The controller 16 is controlled according to an operating program stored in ROM 18. In preferred embodiments, the input 22 of the controller is adapted to receive data corresponding to the "desired" enhancement level of each pel (i.e., the enhancement state of each pel in the "desired" image). Such data may be provided as, e.g., a graphics-type print job generated at a personal computer equipped workstation, a scanned image from an image scanner, or as any other suitable image to be displayed or printed in graphic form. Based on the print data input, a preselected kernel and a predetermined threshold level, the controller 16 outputs print data on line 14, corresponding to the actual bi-level state of each pel in the printed image.

Error diffusion kernel values (such as those discussed above with respect to the Floyd et al. kernel or the Jarvis et al. kernel, or other suitable kernels) may be entered via input 22 and stored in RAM 20 for each print job (or for each color channel of each print job). Alternatively, one or plural kernels may be pre-stored in the RAM 20 or in the ROM 18. Similarly, predetermined threshold levels may be entered via input 22 or, alternatively, pre-stored in RAM 20 or ROM 18. As yet another alternative, the controller 16 functions to calculate threshold values based on the minimum and maximum enhancement levels of a plurality of pels, as discussed below.

In preferred embodiments, the controller 16 and memory devices 18 and 20 are provided as part of a conventional personal computer or other host computer system, or as additional components added to such computer systems. In this manner, the printer 12 may be a standard bi-level printer, for example, a solid ink printer of the type sold by the assignee, Dataproducts Corporation, as model JOLT PS (or other suitable printer or image forming device). The bi-level print data, including the "actual" bi-level pel enhancement states, is rendered by the controller 16, remote from the printer.

In further embodiments, the controller 16 and memory devices 18 and 20 may be provided as part of the printer, or as additional components added between the printer driver and the source of the "desired" image data. In further preferred embodiments, the controller 16 and memory devices 18 and 20 may be implemented on a single silicone chip or circuit card, e.g., for ready addition or replacement in a host computer or printer housing. It will be understood, that in each of the above embodiments, other memory or storage means may be employed (as an alternative to the ROM 18 and RAM 20), such as well known optical or magnetic recording devices.

In operation, each channel (e.g., RGB color channel, such as red, green or blue channels; or Lab channel, such as luminance, red direction and blue direction channels; or other suitable channel division) of an image is treated individually. For each channel, a suitable error diffusion kernel is selected and stored in RAM 20. The same error diffusion kernel may be employed for each color channel of the image. The "desired" pel enhancement level data for each pel of at least a portion of the image (and, preferably, of the entire image) is entered, via input 22, to the controller and is subsequently stored in RAM 20.

The controller determines the minimum and the maximum level of "desired" enhancement of all of those pels for which data was received at input 22 and for which the data specifies at least some level of enhancement above a non-enhanced level. In particular, each pel is represented by an 8 bit word (other embodiments may employ words of greater or fewer bits). The maximum number of levels of enhancement which can be coded with each 8 bit pel word is 256. Thus, for each channel, each pel of the "desired" image has an enhancement level somewhere within the range of 0 and 255. Data corresponding to these 256 possible pel enhancement levels are converted by the controller 16 into bi-level data for controlling the bi-level printer.

One possible procedure for converting data corresponding to one of the 256 "desired" pel enhancement levels to data corresponding to one of the two bi-level values is by comparison of the "desired" enhancement level data with the mid-point of the 0 to 255 range of possible values of the "desired" enhancement level data. That is, a determination is made as to which side of the mid-point between 0 and 255 (i.e., 127) the "desired" pel enhancement level falls. If the "desired" pel enhancement level is greater than 127, then the corresponding "actual" printed pel will have a fully enhanced state (e.g., corresponding to level 255). If the "desired" pel enhancement level is less than 127, then the corresponding "actual" printed pel will have an non-enhanced state (e.g., corresponding to level 0). The error between the "actual" state (0 or 255) of the printed pel and the "desired" enhancement level is distributed among neighboring pels, at weight levels dictated by a suitable error diffusion kernel.

The error factors calculated for any one pel are combined with the "desired" enhancement level data for that pel before comparison with the mid-point level 127. Thus, if the "desired" enhancement level of a pel, as modified by any error diffusion calculations performed upon determining the state of neighboring pels, falls below (or above) the mid-point level 127, then the "actual" state of the corresponding printed pel will be 0 (or 255).

In the above example, the mid-point (127) between all possible enhancement values (0 to 255) was used as a "threshold" value to determine whether the "actual" enhancement state of each pel in the printed image. However, according to preferred embodiments of the present invention, significantly improved image clarity, tone continuity and image sharpness may be provided where the "threshold" value is determined as the mid-point between the minimum and maximum enhancement levels of all of those pels for which data was received at input 22 and for which the data specifies at least some level of enhancement above a non-enhanced level (rather than the mid-point, 127, of the range, 0 to 255, of "possible" enhancement levels).

Figure 2:
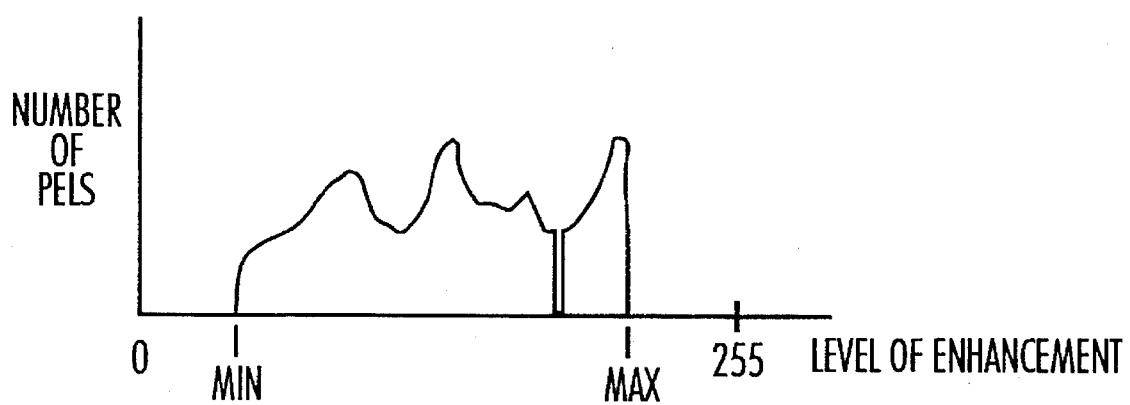
FIG. 2 shows a plot of the pel enhancement level values versus numbers of pels.

For example, if one were to plot the quantity of pels versus pel enhancement levels for all or a portion of an image for any one channel (e.g., RGB or Lab channel), the plot might appear as shown in FIG. 2. Referring to FIG. 2, the plot extends (continuously or discontinuously) from a minimum enhancement level value MIN to a maximum enhancement level value MAX. According to a preferred embodiment of the invention, instead of employing the midpoint (e.g., 127) of the range (e.g., 0 to 255) of possible enhancement level values, the "threshold" is determined, individually for each channel, by the following formula:

$$\frac{MAX - MIN}{2}$$

Thus, in preferred embodiments, the "actual" enhancement level of a pel will be low (e.g., 0) when the "desired" enhancement level of the pel (the enhancement level of the pel in the "desired" image), as modified by any error diffusion factors provided from the previous processing of neighboring pels, falls below the "threshold" determined by (MAX–MIN)/2. Similarly, the "actual" enhancement level of a pel will be high (e.g., 255) when the "desired" enhancement level of the pel (the enhancement level of the pel in the "desired" image), as modified by any error diffusion factors provided from the previous processing of neighboring pels, falls at or above the "threshold" determined by (MAX–MIN)/2. The determination of the (MAX–MIN)/2 value may be performed by the controller, based on the maximum and minimum pel enhancement levels for image data stored in RAM 20. Alternatively, the (MAX–MIN)/2 value may be calculated externally and entered, via input 22.

According to further embodiments of the present invention, additional improvements in image clarity, tone continuity and image sharpness, especially near the outer peripheral edges of the image, may be accomplished by programming the controller to reverse the direction of processing individual pels in a line of pels and reversing the error diffusion matrix for each subsequent line of pels.

For example, consider a system wherein the controller processes each pel in a line (or column) of pels (i.e., provides bi-level pel enhancement print data from the "desired" pel enhancement print data for each pel in the line or column). In such a system, the pels in a particular line (or column) may be processed from left to right (or from top to bottom), using the above described Floyd et al. error diffusion matrix, as shown below:

| line-by-line | column-by-column |
|---|---|
| * 7 | 3 |
| 3 5 1 | * 5 |
| | 7 1 |

In preferred embodiments of the present invention, the next line (or column) of pels processed by the controller is processed in the reverse direction relative to the direction of processing of the preceding line (or column), e.g., from right to left (or from bottom to top), using a reversed (or mirror image) matrix, as follows:

| line-by-line | column-by-column |
|---|---|
| 7 * | 3 |
| 1 5 3 | 5 * |
| | 1 7 |

The process of reversing the direction of pel processing and reversing the error diffusion matrix for each subsequent line or column of pels contributes to significant improvements in image clarity, tone continuity and image sharpness, especially near the outer peripheral edges of the image.

As discussed above, in preferred embodiments, each color channel is processed individually using a suitable error diffusion matrix. In addition, the "threshold" value determined by (MAX–MIN)/2 is calculated for each channel independent of the other channels. Furthermore, the direction of processing and the error diffusion matrix are reversed for each subsequent line or column of pels. In combination, these features provide markedly improved image forming quality, preferably for printer systems, video imaging systems or other electronic imaging systems. In addition, each one and various combinations of the above features has been found to significantly improve image clarity, sharpness and tone continuity.

In further preferred embodiments, one or more channels may be weighted greater than the others to emphasize that channel in the resulting image. Further clarity, sharpness and continuity may be accomplished by adjusting, e.g., the weight factors employed in the selected kernel or the threshold value for one or all channels, to accommodate, for example, the dot size or dot spacing limitations of the printer or other image forming device being used. As an example, a preferred embodiment may employ a printer which produces a dot size of about 3.4 mils and a dot spacing of about 180 DPI (dots per inch).

In various printer or image forming applications, it may be desirable to provide print data in a CMYK (cayenne, magenta, yellow and black) printer bit map. This can be accomplished by either processing C, M, Y and K channels separately, as discussed above with respect to the RGB channels, or by converting a 24 bit color bitmap (formed of 8 bits R, 8 bits G, and 8 bits B, processed as discussed above) into a CMYK printer bit map according to well known processes.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. Apparatus for displaying a color image corresponding to a desired image formed of plural picture elements (pels) and dependent upon a predetermined error diffusion kernel, said apparatus comprising:

a source of image data, for providing data corresponding to a desired image formed of plural picture elements (pels) and dependent upon a predetermined error diffusion kernel, said apparatus comprising:

a source of image data, for providing data corresponding to a desired color image, said image data including data corresponding to the level of enhancement of each pel in the desired image;

a first memory location for storing at least one error diffusion kernel;

a controller, including threshold calculation means, responsive to the pel enhancement level data, for determining the maximum (MAX) and minimum (MIN) level of enhancement of all pels for which enhancement level data greater than a non-enhanced level is provided by said source, and for calculating a threshold value per image data by adding the result of (MAX−MIN)/2 to the minimum level of enhancement;

said controller further including comparing means for comparing data corresponding to the enhancement level of each pel in the desired image with the calculated threshold value;

said controller further including bi-level data providing means for providing data corresponding to a first bi-level value for each pel having an enhancement level less than the threshold, and for providing data corresponding to a second bi-level value for each pel having an enhancement level greater than the threshold;

said controller further including error calculation means for determining an error value based on the difference between the level of enhancement of each pel in the desired image and the bi-level value for each pel provided by said bi-level data providing means;

said controller further including means responsive to the error value calculated for each pel and the at least one error diffusion kernel, for distributing the error value among other pels in the image to be displayed; and an image displaying device, responsive to the bi-level pel enhancement data provided by said bi-level data providing means, for displaying an image corresponding to the desired image.

2. Apparatus for processing image data dependent upon at least one predetermined error diffusion kernel to provide display data for an image display device, wherein the image data corresponds to a desired color image formed of plural picture elements (pels) in each of a plurality of channels and includes data corresponding to the desired level of enhancement of each pel in the desired image for each of the plural channels, the apparatus comprising:

a controller responsive to the desired pel enhancement level data and the at least one error diffusion kernel, for providing bi-level pel enhancement data corresponding to the image data for each channel;

the controller including a threshold calculation means for determining, for each channel, a threshold value per image data based on the desired pel enhancement data;

the controller further including comparing means for comparing data corresponding to the enhancement level of each pel in the desired image with the threshold value;

the controller further including bi-level data providing means for providing data corresponding to a first bi-level value for each pel having an enhancement level less than the threshold value, and for providing data corresponding to a second bi-level value for each pel having an enhancement level greater than the threshold value;

the controller further including error calculation means for determining an error value based on the difference between the enhancement level of each pel in the desired image and the bi-level value for each pel;

the controller further including means responsive to the error value calculated for each pel and the at least one error diffusion kernel, for distributing the error value among other pels in the image to be displayed; and means for providing the bi-level pel enhancement data for each channel to the image display device.

3. Apparatus according to claim 2, wherein the means responsive to the error value includes:

means for processing each pel in first and second adjacent lines of pels to produce bi-level pel enhancement data for each pel in each channel;

wherein the at least one error diffusion kernel comprises a matrix of error distribution values; and wherein the direction of processing of pels in the first line is opposite to the direction of processing of pels in the second line.

4. Apparatus according to claim 3, wherein the means responsive to the error value further includes:

means for calculating the bi-level pel enhancement data for the pels of the first line according to the matrix of error distribution values;

means for reversing the matrix of error distribution values from which the bi-level pel enhancement data is calculated for the pels of the first line; and means for calculating the bi-level pel enhancement data for the pels of the second line according to the reversed matrix of error distribution values.

5. A method for processing image data dependent upon at least one predetermined error diffusion kernel to provide display data for an image display device, wherein the image data corresponds to a desired color image formed of plural picture elements (pels) in each of a plurality of channels and includes data corresponding to the desired level of enhancement of each pel in the desired image for each of the plural channels, the method comprising the steps of:

calculating bi-level pel enhancement data corresponding to the image data for each channel; and transferring the bi-level enhancement data to the image display device;

wherein the step of calculating comprises:

(a) assigning an enhancement value for each level of the bi-level pel enhancement data, wherein the assigned bi-level enhancement values comprise a high level value and a low level value;

(b) determining for each channel a threshold enhancement level value between the high level value and the low level value;

(c) comparing the desired level of enhancement, as modified by any error values determined in step (f), of each pel in each channel with the threshold enhancement level value determined for the respective channel;

(d) generating high level value bi-level enhancement data for each pel in which the modified desired level of enhancement exceeds the threshold enhancement level value;

(e) generating low level value bi-level enhancement data for each pel in which the modified desired level of enhancement is less than the threshold enhancement level value;

(f) determining an error value by calculating the difference between the modified desired level of enhancement and the threshold enhancement level value for each pel in each channel;

(g) for each pel in each channel for which low level value data is generated in step (e), modifying other pels in each respective channel by distributing and adding portions of the difference calculated in step (f) to the desired level of enhancement of a plurality of other pels in each respective channel based on the at least on error diffusion kernel; and (h) for each pel in each channel for which high level value data is generated in step (d), modifying other pels in each respective channel by distributing and subtracting portions of the difference calculated in step (f) to the desired level of enhancement of a plurality of other pels in each respective channel based on the at least on error diffusion kernel.

6. A method as recited in claim 5, wherein the step of calculating comprises the steps of:

processing each pel in first and second adjacent lines of pels to produce bi-level pel enhancement data for each pel in each channel;

wherein the at least one error diffusion kernel comprises a matrix of error distribution values; and wherein the direction of processing of pels in the first line is opposite to the direction of processing of pels in the second line.

7. A method as recited in claim 6, wherein the desired image is formed of plural pels in at least first and second adjacent lines of pels, the step of calculating further comprises the steps of:

calculating the bi-level pel enhancement data for the pels of the first line according to the matrix of error distribution values;

reversing the matrix of error distribution values from which the bi-level pel enhancement data is calculated for the pels of the first line; and calculating the bi-level pel enhancement data for the pels of the second line according to the reversed matrix of error distribution values.

8. A method for processing image data dependent upon at least one predetermined error diffusion kernel to provide display data for an image display device, wherein the image data corresponds to a desired color image formed of plural picture elements (pels) in each of a plurality of channels and includes data corresponding to the desired level of enhancement of each pel in the desired image for each of the plural channels, the method comprising the steps of:

determining for each channel and per image data a threshold value between a high level value and a low level value of the desired level of enhancement;

comparing the desired level of enhancement of each pel channel with the threshold value determined for the respective channel;

calculating bi-level pel enhancement data corresponding to the image data for each channel by generating high level value bi-level enhancement data for each pel in which the modified desired level of enhancement exceeds the threshold value and by generating low level value bi-level enhancement data for each pel in which the modified desired level of enhancement is less than the threshold enhancement level value; and transferring the bi-level enhancement data to the image display device;

wherein the step of determining a threshold enhancement level value comprises the steps of:

determining, for each channel, the maximum enhancement level (MAX) of the pels of the image data;

determining, for each channel, the minimum enhancement level (MIN) of the pels of the image data;

calculating the threshold enhancement level by adding the result from the formula:

$$\frac{(MAX) - (MIN)}{2}$$

to the minimum enhancement level.

9. A method as recited in claim 8, wherein the step of calculating comprises the steps of:

processing each pel in first and second adjacent lines of pels to produce bi-level pel enhancement data for each pel in each channel;

wherein the at least one error diffusion kernel comprises a matrix of error distribution values; and wherein the direction of processing of pels in the first line is opposite to the direction of processing of pels in the second line.

10. A method as recited in claim 9, wherein the desired image is formed of plural pels in at least first and second adjacent lines of pels, the step of calculating further comprises the steps of:

calculating the bi-level pel enhancement data for the pels of the first line according to the matrix of error distribution values;

reversing the matrix of error distribution values from which the bi-level pel enhancement data is calculated for the pels of the first line; and calculating the bi-level pel enhancement data for the pels of the second line according to the reversed matrix of error distribution values.

11. A method for processing image data dependent upon at least one predetermined error diffusion kernel to provide display data for an image display device, wherein the image data corresponds to a desired color image formed of plural picture elements (pels) in each of a plurality of channels and includes data corresponding to the desired level of enhancement of each pel in the desired image for each of the plural channels, the method comprising the steps of:

determining for each channel and per image data a threshold value between a high level value and a low level value of the desired level of enhancement;

comparing the desired level of enhancement of each pel channel with the threshold value determined for the respective channel;

calculating bi-level pel enhancement data corresponding to the image data for each channel by generating high level value bi-level enhancement data for each pel in which the modified desired level of enhancement exceeds the threshold value and by generating low level value bi-level enhancement data for each pel in which the modified desired level of enhancement is less than the threshold enhancement level value; and transferring the bi-level enhancement data to the image display device;

wherein the step of calculating comprises the steps of:

processing each pet in first and second adjacent lines of pels to produce bi-level pel enhancement data for each pel in each channel;

wherein the at least one error diffusion kernel comprises a matrix of error distribution values; and wherein the direction of processing of pels in the first line is opposite to the direction of processing of pels in the second line; and wherein the desired image is formed of plural pels in at least first and second adjacent lines of pels, the steps of calculating further comprises the steps of:

calculating the bi-level pel enhancement data for the pels of the first line according to the matrix of error distribution values;

reversing the matrix of error distribution values from which the bi-level pel enhancement data is calculated for the pels of the first line; and calculating the bi-level pel enhancement data for the pels of the second line according to the reversed matrix of error distribution values.

12. Apparatus for processing image data dependent upon at least one predetermined error diffusion kernel to provide display data for an image display device, wherein the image data corresponds to a desired color image formed of plural picture elements (pels) in each of a plurality of channels and includes data corresponding to the desired level of enhancement of each pel in the desired image for each of the plural channels, the apparatus comprising:

a controller responsive to the desired pel enhancement level data and the at least one error diffusion kernel;

means for processing each pel in first and second adjacent lines of pels to produce bi-level pel enhancement data for each pel in each channel;

wherein the at least one error diffusion kernel comprises a matrix of error distribution values; and wherein the direction of processing of pels in the first line is opposite to the direction of processing of pels in the second line;

means for calculating the bi-level pel enhancement data for the pels of the first line according to the matrix of error distribution values;

means for reversing the matrix of error distribution values from which the bi-level pel enhancement data is calculated for the pels of the first line;

means for calculating the bi-level pel enhancement data for the pels of the second line according to the reversed matrix of error distribution values; and means for providing the bi-level pel enhancement data for each channel to the image display device.

13. A method for processing image data dependent upon at least one predetermined error diffusion kernel to provide display data for an image display device, wherein the image data corresponds to a desired color image formed of plural picture elements (pels) in each of a plurality of channels and includes data corresponding to the desired level of enhancement of each pel in the desired image for each of the plural channels, the method comprising the steps of:

calculating bi-level pel enhancement data corresponding to the image data for each channel; and transferring the bi-level enhancement data to the image display device;

wherein the step of calculating comprises the steps of:

processing each pel in first and second adjacent lines of pels to produce bi-level pel enhancement data for each pel in each channel, wherein the at least one error diffusion kernel comprises a matrix of error distribution values, and wherein the direction of processing of pels in the first line is opposite to the direction of processing of pels in the second line;

calculating the bi-level pel enhancement data for the pels of the first line according to the matrix of error distribution values;

reversing the matrix of error distribution values from which the bi-level pel enhancement data is calculated for the pels of the first line; and calculating the bi-level pel enhancement data for the pels of the second line according to the reversed matrix of error distribution values.

* * * * *